(12) United States Patent
Salisbury et al.

(10) Patent No.: US 6,630,670 B2
(45) Date of Patent: Oct. 7, 2003

(54) THERMAL IMAGING SYSTEM

(75) Inventors: Richard Salisbury, Cambridge (GB); Bruce Cairnduff, Cambridge (GB)

(73) Assignee: Thermoteknix Systems Limited, Cambridge (GB)

( * ) Notice: Subject to any disclaimer, the term of this patent is extended or adjusted under 35 U.S.C. 154(b) by 0 days.

(21) Appl. No.: 09/904,199

(22) Filed: Jul. 11, 2001

(65) Prior Publication Data

US 2002/0030162 A1 Mar. 14, 2002

(30) Foreign Application Priority Data

Sep. 12, 2000 (GB) .............................................. 0022386

(51) Int. Cl.$^7$ .............................................. H01L 27/14
(52) U.S. Cl. ................... 250/330; 250/332; 250/339.02
(58) Field of Search ................................. 250/330, 331, 250/332, 333, 334, 339.02

(56) References Cited

U.S. PATENT DOCUMENTS 5,287,183 A * 2/1994 Thomas et al. ............. 348/571

* cited by examiner

Primary Examiner—Constantime Hannaher
Assistant Examiner—Timothy Moran
(74) Attorney, Agent, or Firm—William Michael Hynes; Townsend and Townsend and Crew LLP

(57) ABSTRACT

A thermal imaging system comprising a camera (11), a control device (12) which is operable to control movement of the camera (11) and operation of the camera shutter and a computer (13) which includes thermal image processing software which allows manipulation or display of thermal images collected by the camera (11). The camera (11) is operated by use of the control device (12) to expose a thermal image over a selected time interval to correspondingly select a thermal image over a particular selected temperature range. The camera shutter is operated at a selected frequency, and exposure time of the image is varied to acquire thermal images over different selected temperature ranges. However, preferably every image is taken at the same time exposure, which allows display of a continuous real time display of thermal characteristics of the object over this selected temperature range. Thermal information over the other temperature range can also be displayed or used as desired.

9 Claims, 1 Drawing Sheet

THERMAL IMAGING SYSTEM

Figure 1:
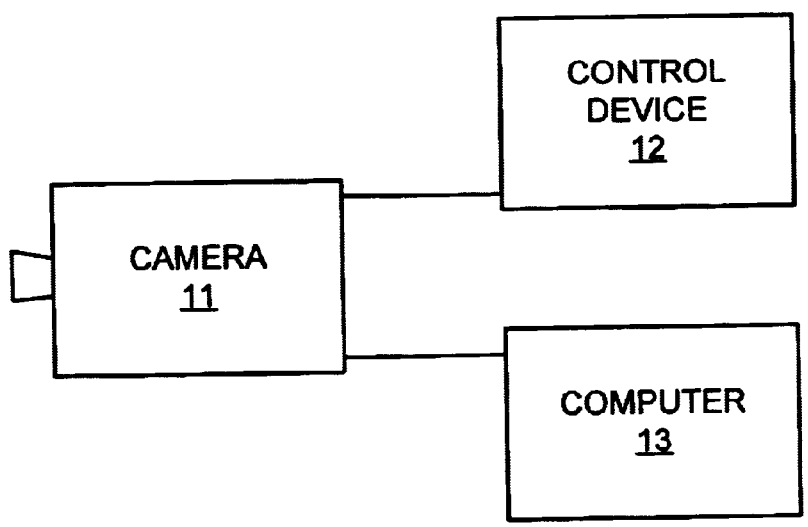

This invention relates to a thermal imaging system and in particular a thermal imaging system for monitoring temperature profiles in kilns or furnaces.

When monitoring temperature profiles within a kiln or furnace it is usual to use a thermal imaging camera to produce thermal images and to display these to a user on a suitable display. The images can be displayed in real time or can be processed prior to or during display. Usually the images are displayed on a visual display unit (VDU) of a computer which may be provided with image processing software to process the normal images. In conventional systems of this type, only a single temperature range is capable of being measured by the camera at any one time and thermal images in the specified temperature range are displayed in real time. This can lead to problems because with such systems, the high temperature images are dominant because luminance increases exponentially with temperature and therefore the low temperature images can be masked by the dominant high temperature images and can even be indistinguishable from noise. This means that the dynamic range of such camera is quite small. This is particularly a problem when a silicon CCD camera is used because whilst this camera is able to produce adequate images in the near infrared region, it does suffer from a restricted dynamic range. If the dynamic range is to be increased to give greater resolution of temperatures in the thermal images, and in particular of low temperatures, it is necessary to cool the camera used and also to use very high specification components in the camera and it will be appreciated that this leads to a considerable increase in the cost of manufacture of these cameras and any imaging system incorporating them.

It is an object of the present invention to provide a thermal imaging system in which images taken over multiple temperature ranges can be monitored simultaneously whilst only images from one selected temperature range are displayed to a user. It is a further object of the invention to provide a relatively low cost imaging system in which the dynamic range of the system is increased.

Thus and in accordance with the present invention therefore there is provided a thermal imaging system comprising a camera to produce thermal images of an object and a display device to display thermal images produced by the camera, said camera including shutter means operable to allow exposure of an image for a selected interval, each different selected interval allowing the camera to produce a thermal image over a selected temperature range, wherein said system is operable such that one said selected interval of operation of said shutter is repeated periodically and said display device displays said thermal image produced at said one selected interval.

With this arrangement it is possible for the thermal imaging system to produce on a display a continuous real time display of a thermal image of an object over one selected temperature range whilst also simultaneously allowing monitoring of the thermal image over other temperature ranges.

Preferably the shutter means is an electronic shutter and is operable to allow exposure over selected intervals in the range $\frac{1}{50}$ to $\frac{1}{10,000}$ secs.

Preferably the one said selected interval of operation of the shutter is repeated every second shutter operation.

Preferably the system includes a processing device which is adapted to process the thermal image produced by the camera prior to display on the display device. Preferably the processing device includes a user operable control whereby a user can control said processing of the thermal image.

Preferably the display device comprises a computer system and most preferably the computer system includes thermal image processing software. In the latter case, the display device and the processing device are formed as one unit.

The invention will now be described further by way of example only and with reference to the accompanying drawings, the single FIGURE of which shows in schematic form one embodiment of a thermal imaging system in accordance with the present invention.

Referring now to FIG. 1, there is shown a thermal imaging system comprising a camera 11 linked to a control device 12 and a computer 13.

The camera 11 generally comprises a conventional CCD camera which is operable to produce thermal images of objects in the near infrared part of the spectrum (typically 0.4 to 1 $\mu$m). The camera 11 includes a shutter (not shown) which is operable to allow or hinder photons from the object producing thermal images of objects. By appropriate choice of the interval over which an image is exposed, when the shutter is open, it can be arranged that the camera will produce thermal images in a particular selected temperature range. Thus for example it is possible for the interval over which the image is exposed to be one of $\frac{1}{50}$, $\frac{1}{100}$, $\frac{1}{125}$, $\frac{1}{500}$, $\frac{1}{1000}$, $\frac{1}{2000}$, $\frac{1}{4000}$ or $\frac{1}{10,000}$ sec. In the system of the invention, the shutter is formed as an electronic shutter of conventional form. The shutter is operable to allow exposure of an image for a calculated interval as mentioned above and the preferred calculated intervals are in the range $\frac{1}{50}$ to $\frac{1}{10,000}$ sec. Whilst this is the preferred range, any frequency range can be used as desired or as appropriate.

The control device 12 is operable to control the movement of the camera. For example the camera 11, can be mounted in a kiln or furnace wall and can be moved in such a way than when it is taking thermal images it is moved towards the interior of the kiln and when thermal imaging is complete it is moved away from the interior of the kiln. In these circumstances this movement can be controlled using the control device 12.

Furthermore, the control device 12 is also operable to control operation of the shutter of the camera 11 and in particular is operable on a real time basis to control operation of the shutter to allow exposure of the image for a calculated interval, the calculated intervals being chosen in accordance with user instructions.

The computer 13 comprises a conventional personal computer which is programmed with thermal image processing software which allows any desired manipulation or display of the thermal images collected by the camera. The thermal images can be stored on the computer 13 and can be recalled at any time as desired or as appropriate. The computer 13 includes a visual display unit (VDU) upon which the thermal images can be displayed.

In use, the camera 11 is mounted relative to the object whose thermal image is to be taken such as for example the interior of a kiln, furnace or other object. Using the control device 12 the camera 11 is positioned in its desired location to take the thermal images required. As mentioned above, by appropriate operation of the shutter using the control device 12, the shutter can be operated so as to expose an image over a selected time interval whereby the camera 11 can produce a thermal image over a particular selected temperature range. In the system of the invention, the shutter is operated at a selected frequency (e.g. 50 HZ or 60 HZ) and during its operation the exposure of the image is varied, by varying the time interval in the manner mentioned, to acquire thermal images over different selected temperature ranges. Preferably, every second image which is produced, is taken at same exposure time intervals and therefore a continuous real time image of the thermal characteristics of the object over this selected temperature range can be provided. The thermal image taken at this one selected temperature range is displayed on the computer whereby a user can see a continuous real time thermal image of the object and can therefore monitor its thermal characteristics over a period of time. However, the thermal information taken over the other temperature ranges is also available to the user and may also be displayed or used in any other appropriate way. For example thermal characteristics outside the selected temperature ranges can be displayed alongside or instead of the thermal image taken over the selected temperature range.

Thus it will be appreciated that with the system of the invention it is possible to display a continuous real time thermal image of an object over the selected temperature range. However, the dynamic range is increased since thermal images are also taken over other temperature ranges simultaneously. This enables problems with high temperatures dominating the image in any particular temperature range to be addressed since high temperatures in one temperature range are low temperatures in another temperature range thereby by appropriate variation of the temperature range any desired resolution of thermal image can be obtained.

It is of course to be understood that the invention is not intended to be restricted to the details of the above embodiment which is described by way of example only.

For example, whilst in the embodiment described, every second image is produced by taking the same exposure time interval, it will be appreciated that the only essential feature is that periodically the image taken is produced at the same exposure time interval in order that a real time continuous display of thermal images in the calculated temperature range can be achieved.

Furthermore, whilst in the embodiment described a CD camera is utilised as a means of producing thermal images of objects, the concept of the present invention can be applied to any suitable detector in which a shutter arrangement can be utilised to vary the time of exposure. Thus for example, the concept of the invention could be applied to the use of detectors which operate in parts of the electromagnetic spectrum other than the near infrared such as visible X-ray wavelengths or to detectors which detect sound or vibration by detection of energy created by that sound or vibration.

Further, whilst in the embodiment described, the shutter arrangement is described as being an electronic shutter of conventional form, in fact the shutter arrangement can take many different forms such as for example, a mechanical shutter or aperture arrangement or any optical system which is capable of operating as a shutter arrangement or which is capable of alternating incoming radiation. The electronic shutter of conventional form can be provided in or as part of a conventional CCD (Charge coupled device) camera.

Still further, whilst it is also described that the system continuously displays images taken at one particular exposure, it has now been realised that in many circumstances it will be preferable to additionally display on a continuous basis wide dynamic range images obtained by integrating the measurements made over all of the exposures utilised. This may be particularly important where slow moving images are being monitored or where visualisation of the actual images at any one time is important.

Furthermore, while preferred exposure rates for images are mentioned for the embodiment described, it has been realised that if an appropriate camera or other detector is used it should be possible to produce images for display at standard video rates (50/60 HZ).

What is claimed is:

1. A thermal imaging system comprising:
   a camera to produce thermal images of an object:
      shutter means operable to allow successive exposures of thermal images for a plurality of selected intervals of differing time periods, each selected interval of differing time period allowing the camera to produce a thermal image over a differing selected temperature range;
      means operating the shutter means such that one said selected interval of differing time period of said shutter is repeated periodically;
      a display device to display thermal images produced by the camera, the display device displaying the thermal image produced over the selected temperature range corresponding to the differing time period of the one selected interval.

2. A system according to claim 1, wherein the shutter means is an electronic shutter.

3. A system according to claim 1, wherein the shutter means is operable to allow exposure over differing time periods in the range of $\frac{1}{50}$ to $\frac{1}{10,000}$ second.

4. A system according to claim 1, wherein the means operating the shutter means is such that one said selected interval of differing time period of said shutter is repeated every second shutter operation.

5. A system according to claim 1, wherein the system further includes a processing device which is adapted to process the thermal image produced by the camera prior to display on the display device.

6. A system according to claim 5, wherein the processing device includes a user operable control whereby a user can control said processing of the thermal image.

7. A system according to claim 1, wherein the display device comprises a computer system.

8. A system according to claim 7, wherein the computer system includes thermal image processing software.

9. A system according to claim 8, wherein the display device and the processing device are formed as one unit.

\* \* \* \* \*